Feb. 3, 1942. C. E. McCARTNEY 2,271,702
MILK BOTTLE RACK
Filed May 1, 1941
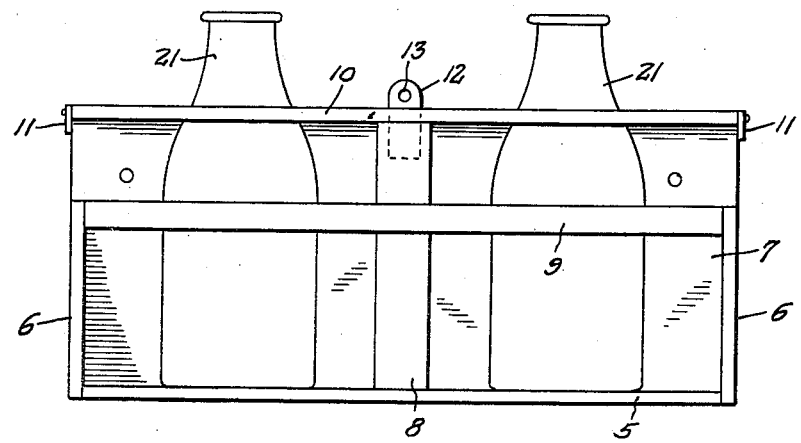
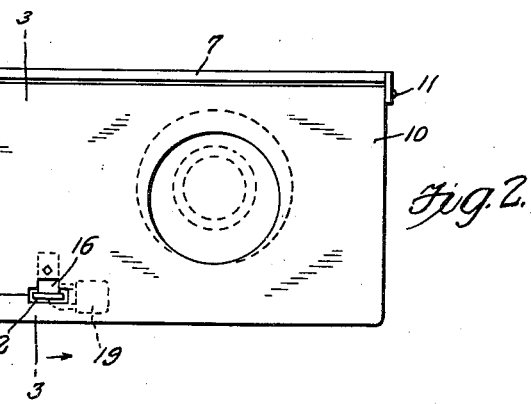
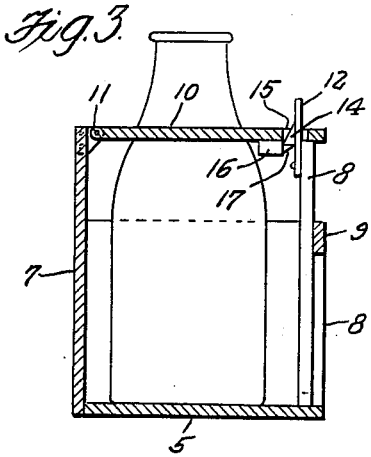 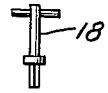 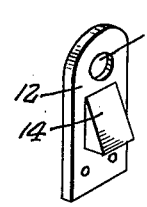
Inventor
Charles E. McCartney.
By Clarence A. O'Brien
Attorney Patented Feb. 3, 1942

2,271,702

UNITED STATES PATENT OFFICE 2,271,702

MILK BOTTLE RACK

Charles E. McCartney, Port Arthur, Tex.

Application May 1, 1941, Serial No. 391,427

1 Claim. (Cl. 211—4)

This invention relates to new and useful improvements in milk bottle racks and more particularly to a rack which can be opened only by a person having the proper key.

The principal object of the present invention is to provide a milk bottle rack having bottle embracing means which can be locked, but conveniently displaced when bottle removal or placement is required.

Other objects and advantages of the invention will become apparent to the reader of the following specification.

In the drawing:—

Figure 1 represents a side elevational view of the rack.

Figure 2 is a top plan view of the rack.

Figure 3 is a section on the line 3—3 of Figure 2.

Figure 4 is an elevational view of the key.

Figure 5 is a perspective view of the keeper.

Referring to the drawing wherein like numerals designate like parts, it can be seen in Figure 1 that the first form of the invention consists of a rack having a bottom 5, end walls 6, a back wall 7, a vertically extending bar 8 which extends from the forward edge of the bottom 5 upwardly and is crossed at its front by a horizontal bar 9 extending between the end walls 6.

Numeral 10 denotes a lid which is hingedly secured as at 11 to the upper edge of the back wall 7.

On the upper end of the bar 8 is a vertically extending plate 12 having a padlock hasp receiving opening 13 therein and also a beveled block 14. The plate 12 and block 14 are capable of being received by an opening 15 in the free edge portion of the lid 10. At the underside of the lid 10 is a key operated lock 16 having a bolt 17 capable of passing under the beveled block 14 to prevent rising of the lid 10. It is preferable that the lock 16 be of the type having a spring normally maintaining the bolt 17 projected so that all a milk man has to do is to force the lid 10 downwardly to cause latching of the parts. When he desires to replace the empty milk bottles with filled bottles, he needs his key 18 only to open or retract the bolt 17. Obviously various designs of keys 18 may be resorted to.

As before stated, instead of having the specific type of lock 16, the lock 16 may be left with its bolt 17 retracted and a padlock 19 may be used in conjunction with the upper end of the plate 12.

The lid 10 is formed with openings 20 through which the neck portions of milk bottles 21 can protrude as shown in Figure 1.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A rack of the character described comprising a bottle container, a swingable top structure pivoted on the container for embracing the neck portions of bottles, and detent means between the top structure and the container, said detent structure comprising a beveled member rising from the container, said top structure having an opening therein for partly receiving the beveled member and a lock having a retractible bolt carried by the underside of the top structure and disposed in the path of the beveled member.

CHARLES E. McCARTNEY.